United States Patent [11] 3,587,090

[72] Inventors Jean A. Labeyrie
21 rue Lenotre, Vaucresson;
Antonine A. Jousset, 50 Boulevard
Beaumarchais, Paris; Edouard E. Asseo, 2
rue Aristide Briand, Sainte-Genevieve-des
Bois; Roger Kierbel, 40 rue Alfred de,
Lozere-sur-Yvette, all of, France

[21] Appl. No. 731,831
[22] Filed May 24, 1968
[45] Patented June 22, 1971
[32] Priority May 24, 1967
[33] France
[31] 107702

[54] GREAT RAPIDITY DATA TRANSMISSION SYSTEM
4 Claims, 6 Drawing Figs.

[52] U.S. Cl. .......... 340/347
[51] Int. Cl. .......... H03k 13/24
[50] Field of Search .......... 178/66, 68; 179/15.55, 15; 235/154; 325/38; 340/347

[56] References Cited
UNITED STATES PATENTS

| | | | |
|---|---|---|---|
| 3,439,330 | 4/1969 | Sipress | 340/146.1 |
| 3,089,134 | 5/1963 | Robinson | 340/347 |
| 3,369,222 | 2/1968 | Webb | 340/172.5 |

*Primary Examiner*—Robert L. Richardson
*Assistant Examiner*—Kenneth W. Weinstein
*Attorney*—Holman & Stern

ABSTRACT: A data transmission system in which information originally consisting of a succession of binary elements is divided into consecutive groups having a constant number of binary elements, and in which each one of said groups is thereafter replaced, according to a predetermined relationship, by a group having a larger number of binary elements, the arrangement being such that, in the latter groups, every transition between adjacent binary elements of opposite values is preceded by at least two binary elements of the same value.

INVENTORS
JEAN A. LABEYRIE
ANTOINE A. JOUSSET
EDOUARD E. ASSEO AND
ROGER KIERBEL

ATTORNEYS:
Glascock, Downing & Seebold

GREAT RAPIDITY DATA TRANSMISSION SYSTEM

The present invention relates to a data transmission device with accelerated speed of transmission.

It is known that in data transmission systems the data are transmitted in "blocks" of constant length *m*, that is to say the blocks all comprise *m* recurrent binary pulses.

If the speed of transmission in bands of the binary elements in the transmission channel used is *R* and if *D* is the distortion undergone by the signal formed by these binary elements, the ratio $Z=D/R$ defines what is called "width of the infringement zone." If one calls "transition" of a transmitted signal each change of binary value of the signal, the quantity *Z* defines the duration of a time interval in which the transition of the received signal can fluctuate with respect to the corresponding transition of the transmitted signal.

The width of the infringement zone defines the quality of the received signal. It depends on the speed of transmission *R* and consequently on the duration $1/R$ of the binary elements constituting the signal. It will be the same, and consequently the quality of transmission will be the same, if the binary elements were made twice as long and were transmitted at double the speed.

The invention is based on the idea that, the transition being a change of binary value, is sufficiently defined by the binary elements which enclose it and that, in consequence, it must be possible to double the adjacent binary elements located on one and the other side of each transition of the signal and to transmit the totality of the signal at twice the speed. As, on an average, each signal does not contain as many transitions as binary elements, the signal resulting from the doubling of the binary elements adjacent to the transitions of an original signal will include, in a general way, less than twice the binary elements of the original signal. By transmitting the resulting signal at double the speed of the transmission speed of the original signal, the duration of transmission of the resulting signal will be, in general, shorter than the duration of transmission of the original signal.

The object of the invention is to achieve a data transmission system in which, before transmission, the signals formed of binary elements to be transmitted undergo a doubling of the duration of the binary elements adjacent to the transitions, or, in other words, in which the binary elements enclosing the transitions are doubled.

As the number of transitions of each signal is variable, the simple doubling of the binary elements adjacent to the transitions produces signals in which the total number of binary elements is variable. Given that in the data transmission systems the total number of binary elements per signal is very generally constant, the transmission system, as it has just been set out, would not be fully satisfactory.

Another object of the invention is to achieve a data transmission system in which the original signals, having a given number of binary elements and a variable number of transitions, are transformed into signals having a number of binary elements greater than the said given number but less than its double, and the same number of transitions.

A. The case of substituted signals with a variable number of binary elements.

A simple law which would allow the data transmission system to satisfy the above conditions can be established starting from the following considerations.

Let an "equiprobable" series (number of 1 equal to number of 0) of binary elements for transmission at the speed *R* be, for example, the binary series $S_{10}$ of 10 elements (FIG. 6, line *a*):

0↑1↑0↑1 1↑0↑1↑0 0↑1 ($S_{10}$)

This series ($s_{10}$) contains seven transitions shown by arrows. One can transform this series into a series of 17 binary elements possessing likewise seven transitions. It suffices, in fact, to introduce at each transition of the series $S_{10}$, a new binary element the value of which is equal to that of the binary element which precedes it. One thus obtains the series $S'_{17}$ as follows (FIG. 6, line *b*):

0 0 1 1↑0 0 1 1 1 0 0↑1 1↑0 0 0↑1 ($S'_{17}$)

In this series, two transitions are, at least, always separated by two binary elements of the same value.

Such a series can be transmitted with a rapidity 2 *R* on condition that the distortion *D* remains limited.

From the fact that the series $S_k$ are equiprobable, there is, on an average, one transition 01 or 10 every two binary elements. It thus results that the supplementary binary elements which one adds to obtain a series $S'_{k'}$, repeats the binary value of a binary information element every two information elements of a series $S_k$. In other words, to two binary elements of the series $S_k$ correspond on an average three binary elements of the series $S_{k'}'$ transformed from the series $S_k$. When, per second, $2R$ binary elements of the series $S_{k'}'$ are transmitted, there are emitted $\frac{2}{3}\times2$ *R* binary elements of the series $S_k$; all this takes place as if the series $S_k$ were transmitted with a rapidity$(4/3)$ $R=1.33$ *R*.

B. The case of substituted signals with a fixed number of binary elements.

The coding law proposed above, although simple, presents the disadvantage of causing to correspond with a series $S_k$ of given length *k*, a series $S'_k$ the length *k'* of which is variable according to the number of transitions which the series $S_k$ comprises. Now as has been said above, the binary information emitted by a data transmission system is presented in the form of blocks of constant length *m*. It is thus desirable, from the point of view of data transmission, for the coder of the invention to transform these blocks of length *m* into blocks of length *n*, equally constant.

To satisfy this condition, a coding law, peculiar to the invention, has been established as follows:

The message to be transmitted is supposed to have a length *m*—a multiple of eight—and a group of eight consecutive binary elements, taken in this message, will be called hereafter "character." If the message is broken down into "half-characters," that is to say into groups of four consecutive binary elements, it can be written in the form:

$$|X_{11}X_{12}X_{13}X_{14}| \cdots |X_{i1}X_{i2}X_{i3}X_{i4}| \; |X_{(i+1)1}X_{(i+1)2}X_{(i+1)3}X_{(i+1)4}| \cdots |X_{\lambda1}X_{\lambda2}X_{\lambda3}X_{\lambda4}| \qquad (2)$$

This message thus contains λ half-characters with $$\lambda=m/4$$

A half-character, such as $|X_{j1}\ X_{j2}\ X_{j3}\ X_{j4}|$, offers $2^4=16$ possible combinations, which are none other than the expressions, in binary notation, of the decimal numbers zero to 15.

The first stage of the coding law of the invention consists in causing to correspond, in an "univocal" way, with a half-character $|X_{j1}\ X_{j2}\ X_{j3}\ X_{j4}|$, a series of five binary elements of the form:

$$|\ X_{j1}\ U_{j1}\ U_{j2}\ U_{j3}\ X_{j4}\ |$$

This series keeps the extreme binary elements $X_{j1}$ $X_{j4}$ and replaces the central elements $X_{j2}$ $X_{j3}$ by a series of three elements $U_{j1}$ $U_{j2}$ $U_{j3}$ which must not contain more than a single transition.

A series of three binary elements having only $2^3=8$ possibilities, two of which are to be eliminated from the fact that they include two transitions, the combinations $U_{j1}$ $U_{j2}$ $U_{j3}$ to be considered can only be those contained in table I as follows.

TABLE I

| | $U_{j1}$ | $U_{j2}$ | $U_{j3}$ |
|---|---|---|---|
| Decimal number: | | | |
| 0 | 0 | 0 | 0 |
| 1 | 0 | 0 | 1 |
| 3 | 0 | 1 | 1 |
| 4 | 1 | 0 | 0 |
| 6 | 1 | 1 | 0 |
| 7 | 1 | 1 | 1 |

It would seem, according to this table, that one can cause six combinations $U_{j1}$ $U_{j2}$ $U_{j3}$ to correspond with four half-characters having the same extreme elements and differing only in their central elements. In reality, if one eliminates the nonunivocal series $|X_{j1}\ U_{j1}\ U_{j2}\ U_{j3}\ X_{j4}|$ and those of which the transitions are greater than two, one can make only four combinations $U_{j1}\ U_{j2}\ U_{j3}$ correspond with the four half-characters which have the same limits.

It follows that:

1. to the four half-characters 0 0 0 0, 0 0 1 0, 0 1 0 0, 0 1 1 0, the two limits of which are 0's, one can cause the series 0 0 0 0 0, 0 0 1 1 0, 0 1 1 0 0, 0 1 1 1 0 to correspond;

2. to the four half-characters 0 0 0 1, 0 0 1 1, 0 1 0 1, 0 1 1 1, the two limits of which are 0 and 1, one can cause the series 0 0 0 0 1, 0 0 0 1 1, 0 0 1 1 1, 0 1 1 1 1 to correspond;

3. to the four half-characters 1 0 0 0, 1 0 1 0, 1 1 0 0, 1 1 1 0, the two limits of which are 1 and 0, one can cause the series 1 0 0 0 0, 1 1 0 0 0, 1 1 1 0 0, 1 1 1 1 0 to correspond;

4. to the four half-characters 1 0 0 1, 1 0 1 1, 1 1 0 1, 1 1 1 1, the two limits of which are 1 and 1, one can cause the series 1 0 0 0 1, 1 0 0 1 1, 1 1 0 0 1, 1 1 1 1 1 to correspond.

It is obvious that it remains to determine the assignment of a series of five elements to a given half-character in order to establish a coding table giving satisfaction.

The process of generation of such a table will be detailed hereafter and, as it is possible, starting from the above data, to obtain several coding tables, it will be necessary to choose from among them the table which leads to a convenient realization of the coder of the invention.

In conclusion, the first transformation to which the initial message to be transmitted has been subjected, gives to the said message (2) the aspect as followS:

(3)

$$|X_{11}U_{11}U_{12}U_{13}X_{14}|X_{21}U_{21}U_{22}U_{22}X_{24}| \ldots$$
$$|X_{j1}U_{j1}U_{i2}U_{j3}X_{i4}|X_{(i+1)1}U_{(i+1)1}U_{(i+1)2}U_{(i+1)3}X_{(i+1)4}| \ldots$$
$$|X_{(\lambda-1)1}U_{(\lambda-1)1}U_{(\lambda-1)2}U_{(\lambda-1)3}X_{(\lambda-1)4}|X_{\lambda1}U_{\lambda2}U_{\lambda3}U_{\lambda4}X_{\lambda4}|$$

The series of four binary elements, such as $||U_{J3}\ X_{J4}|\ X_{(J+1)1}\ U_{(J+1)1}||$, resulting from the above transformation, can be coded starting from the same coding law as the half-characters of the initial message. The said series then take the form:

$$||U_{J3}\ U_{J4}|U_{J5}\ U_{J6}\ U_{(J+1)1}||\cdot$$

This second transformation gives to the message (2) the new aspect as follows:

(4)

$$|X_{11}U_{11}U_{12}U_{13}U_{14}U_{15}U_{16}U_{21}U_{22}U_{23}U_{23}U_{25}U_{26} \ldots$$
$$U_{i1}U_{i2}U_{i3}U_{i4}U_{i5}U_{i6} \ldots U_{\lambda1}U_{\lambda2}U_{\lambda3}U_{\lambda4}U_{\lambda5}U_{\lambda6}X_{\lambda4}|$$

The examination of (4) shows that the extreme elements $X_{11}$ and $X_{\lambda4}$ can be doubled without introducing new transitions; whence the definitive aspect of the transformed message given by the coder of the invention:

(5)

$$|X_{11}X_{11}U_{11}U_{12}U_{13}U_{14}U_{15}U_{16} \ldots U_{i1}U_{i2}U_{i3}U_{i4}U_{i5}U_{i6} \ldots$$
$$U_{\lambda1}U_{\lambda2}U_{\lambda3}U_{\lambda4}U_{\lambda5}U_{\lambda6}X_{\lambda4}X_{\lambda4}|$$

In conclusion, the first transformation introduces λ binary elements without increasing the number of transitions of the message to be transmitted. The second transformation introduces (λ−1) binary elements likewise without augmenting the number of transitions. As to the third, it introduces two binary elements, still without introducing new transitions. The coder of the invention thus transforms a message of 4λ binary elements to be transmitted into a coded message of (6λ+1) elements having the same number of transitions.

When, per second, 2 *R* binary elements of the message coded in conformity with the invention are transmitted, (FIG. 6, line *c*), everything takes place as if the speed of transmission of the initial message increased by $$\frac{4\lambda}{6\lambda+1}2R=\left(1.33+\frac{2}{6\lambda+1}\right)R.$$

When the number of half-characters of the message to be transmitted is greater than 34, one recovers the speed indicated at paragraph (A) above, that is 1.33 *R*.

C. Mathematical form of the law of substitution or of coding:

The coding law previously set out can be justified theoretically as follows:

With a total of *m* binary elements, one can form $2^m$ series of binary elements of *m* elements which are none other than the translation into a binary system of the decimal numbers 0 to $(2^m-)$.

To justify the coding process of the invention while taking into account of the considerations set out in paragraph A, it is necessary to show that, starting from these $2^m$ series, it is possible to form L*n* series of *n* binary elements such that the transitions of these series are always separated by two binary elements of the same value. This number L*n* of series can be evaluated as follows.

1. Starting from $L_{(n-2)}$ series of (*n*−2) binary elements, it is possible to form $L_{(n-2)}$ series of *n* binary elements satisfying the imposed conditions.

In fact, it suffices to add at the beginning of each series $L_{(n-2)}$ two identical binary elements, of a polarity opposed to those of the two identical binary elements at the beginning of each series $L_{(n-2)}$.

2. Starting from $L_{(n-1)}$ series of (*n*−1) binary elements, it is possible to form $L_{(n-1)}$ series of *n* binary elements.

In fact, it suffices to repeat the first binary element of a series $L_{(n-1)}$ to obtain a series $L_n$.

Every series $L_n$ having necessarily to satisfy these two conditions, it results that one must have the relation:

$$L_n=L_{n-1}+L_{n-2} \quad (6)$$

with the initial conditions:

$$L_1=0 \quad L_2=2$$

Taking account of these conditions, one has: $L_1=0$, $L_2=2$, $L_3=$, $L_4=4$, $L_5=6$ .................

In other words, the numbers $L_n$ form a known series called "FIBONACCI series" (Leonardo FIBONACCI, Pisa 1175—1240, *Liber quadratorum*).

One demonstrates that a term of the order *n* of this series can be determined by the formula:

$$L_n=(\alpha^n-\beta^n)/K \quad (7)$$

in which α and β are the roots of the equation $x^2-x-1=$and *K* is a constant taking account of the initial conditions.

One thus has:

$$\alpha=\tfrac{1}{2}(1+\sqrt{5})\,;\ \beta=\tfrac{1}{2}(1-\sqrt{5})$$

with $$K=\sqrt{5}/2, \text{ from the fact that } L_2=2.$$

The formula (7) can then be written:

$$L_n=\frac{2}{\sqrt{5}\cdot 2^n}[(1+\sqrt{5})^n-(1-\sqrt{5})^n] \quad (8)$$

When *n* becomes great, one can use the approximate formula:

$$L_n\simeq\frac{2}{\sqrt{5}}\left[\frac{1+\sqrt{5}}{2}\right]^n \quad (9)$$

Given that:

$$L_n=\frac{2}{\sqrt{5}}\left[\left(\frac{1+\sqrt{5}}{2}\right)^n-\left(\frac{1-\sqrt{5}}{2}\right)^n\right]=2^m \quad (10)$$

one can determine the relation which links the length *m* of the initial blocks to the length *n* of the transformed blocks.

Giving the first member of the equation (10) its approximate value (9), we get:

$$\frac{m}{n}\simeq 0.696-\frac{0.1666}{n} \quad (11)$$

a relation which shows that if the length *n* of the transformed blocks is sufficiently great, the ratio *m/n* tends towards 0.696. This value is to be compared with that of the expression 4λ/(6λ+1) when λ is great (0.666).

The limiting value given above is unfortunately only valid for the very large values of *n*. Moreover, the initial and transformed blocks can only contain whole numbers *m* and *n* of binary elements. It is thus necessary to make discrete the relation (10), that is to say to set up a table giving the whole-number values of $m$ and $n$ which best satisfy the relation (10).

Table II below gives this table.

TABLE II

| Lengths $n$ of the transformed blocks | Number of series of length $n$ $L_n$ | Lengths $m$ of the initial blocks |
|---|---|---|
| 1 | 0 | |
| 2 | 2 | 1 |
| 3 | 2 | 1 |
| 4 | 4 | 2 |
| 5 | 6 | 2 |
| 6 | 10 | 3 |
| 7 | 16 | 4 |
| 8 | 26 | 4 |
| 9 | 42 | 5 |
| 10 | 68 | 6 |
| 11 | 110 | 6 |
| 12 | 178 | 7 |
| 13 | 288 | 8 |
| 14 | 466 | 8 |
| 15 | 754 | 9 |
| 16 | 1,220 | 10 |
| 17 | 1,974 | 10 |
| 18 | 3,194 | 11 |
| 19 | 5,168 | 12 |

The examination of Table II and the calculation for the values of $m$ beyond 12 show that for: $m$ beyond 12 show that for:

$m$=4 $2^4$=16 $L_7$=16

$m$=8 $2^8$=324 $L_{13}$= 288

$m$=12 $2^{12}$=5189 $L_{19}$= 5168

$m$=16 $2^{16}$=82944 $L_{25}$= 100736 whence the new table:

TABLE III

| $m$ | $n$ |
|---|---|
| 4=4×1 | 7=6×1+1 |
| 8=4×2 | 13=6×2+1 |
| 12=4×3 | 19=6×3+1 |
| 16=4×4 | 25=6×4+1 |

One thus readily arrives at the conclusion, already enunciated, that if the coder of the invention deals with initial blocks of length $m$x4J, the transformed blocks which it will give must have a length $n$x6Jz1.

D. Coding table.

To conclude, it remains to define the process which allows of substituting, for the central elements $X_{j2}$ $X_{j3}$ of a half-character $X_{j1}$ $X_{j2}$ $X_{j3}$ $X_{j4}$, an appropriate series $U_{j1}$ $U_{j2}$ $U_{j3}$.

The following table IV allows of following easily the method of selection used for the determination of a coding table.

TABLE IV

| Decimal nnmber | Half-characters $X_{j1}$ $X_{j2}X_{j3}$ $X_{j4}$ | Series $U_{j1}U_{j2}U_{j3}$ capable of being substituted at $X_{j2}X_{j3}$ | | | | Series $U_{j1}U_{j2}$ $U_{j3}$ capable of being allocated | |
|---|---|---|---|---|---|---|---|
| 0 | 0 0 0 0 | 0 0 0 | | | | 0 0 0 | |
| 2 | 0 0 1 0 | 0 0 0 | 0 1 1 | | | 0 1 1 | |
| 4 | 0 1 0 0 | 0 0 0 | 1 1 0 | | | 1 1 0 | |
| 6 | 0 1 1 0 | 0 0 0 | 0 1 1 | 1 1 0 | 1 1 1 | 1 1 1 | |
| 1 | 0 0 0 1 | 0 0 1 | 0 1 1 | | | 0 0 1 | 0 1 1 |
| 3 | 0 0 1 1 | 0 0 1 | 0 1 1 | | | 0 1 1 | 0 0 1 |
| 5 | 0 1 0 1 | 0 0 0 | 0 0 1 | 0 1 1 | 1 1 1 | 0 0 0 | 0 0 0 |
| 7 | 0 1 1 1 | 0 0 1 | 0 1 1 | 1 1 1 | | 1 1 1 | 1 1 1 |
| 8 | 1 0 0 0 | 0 0 0 | 1 0 0 | 1 1 0 | | 0 0 0 | 0 0 0 |
| 10 | 1 0 1 0 | 0 0 0 | 1 0 0 | 1 1 0 | 1 1 1 | 1 1 1 | 1 1 1 |
| 12 | 1 1 0 0 | 1 0 0 | 1 1 0 | | | 1 0 0 | 1 1 0 |
| 14 | 1 1 1 0 | 1 0 0 | 1 1 0 | | | 1 1 0 | 1 0 0 |
| 9 | 1 0 0 1 | 0 0 0 | 0 0 1 | 1 0 0 | 1 1 1 | 0 0 0 | |
| 11 | 1 0 1 1 | 0 0 1 | 1 1 1 | | | 0 0 1 | |
| 13 | 1 1 0 1 | 1 0 0 | 1 1 1 | | | 1 0 0 | |
| 15 | 1 1 1 1 | 1 1 1 | | | | 1 1 1 | |

The 16 possibilities of the half-character $X_{j1}$ $X_{j2}$ $X_{j3}$ $X_{j4}$ are classified, in the first column of Table IV, into four groups, each group containing the half-characters of the same limits and these limits being, in the table order, (0 0), (0 1), (1 0) and (1 1). There have been shown above the series of three central elements which one can cause to correspond with the two central elements of the four half-characters.

If one considers, for example, the four half-characters with limits (0 1), it is seen that to them one could cause to correspond the series 0 0 0 0 1, 0 0 0 1 1, 0 0 1 1 1, 0 1 1 1 1; it is thus necessary to choose, from among these four series, those which are suitable for the respective transformations of the half-characters 0 0 0 1, 0 0 1 1, 0 1 0 1, 0 1 1 1. As is seen, several combinations can be suitable for a single half-character. It is thus necessary to make a judicious allocation of these combinations, for they must evidently differ from one half-character to another.

The last two columns of Table IV show the two solutions which can be proposed for the four half-characters of limits (0 0), (0 1), (1 0) and (1 1).

Table V shows the coding table which has been adopted for the coder of the invention.

TABLE V

| $X_{j1}X_{j2}X_{j3}X_{j4}$ | $X_{j1}U_{j1}U_{j2}U_{j3}X_{j4}$ |
|---|---|
| 0 0 0 0 | 0 0 0 0 0 |
| 0 0 0 1 | 0 0 0 1 1 |
| 0 0 1 0 | 0 0 1 1 0 |
| 0 0 1 1 | 0 0 1 1 1 |
| 0 1 0 0 | 0 1 1 0 0 |
| 0 1 0 1 | 0 0 0 0 1 |
| 0 1 1 0 | 0 1 1 1 0 |
| 0 1 1 1 | 0 1 1 1 1 |
| 1 0 0 0 | 1 0 0 0 0 |
| 1 0 0 1 | 1 0 0 0 1 |
| 1 0 1 0 | 1 1 1 1 0 |
| 1 0 1 1 | 1 0 0 1 1 |
| 1 1 0 0 | 1 1 0 0 0 |
| 1 1 0 1 | 1 1 0 0 1 |
| 1 1 1 0 | 1 1 1 0 0 |
| 1 1 1 1 | 1 1 1 1 1 |

The coder of the invention comprises shift and transfer registers associated conveniently in a coder of the classic type, and a bank of unitary memory-units. The coder transforms the central binary elements of the half-character to be coded while taking account, on the one hand, of the composition of the central binary elements and, on the other hand, of the composition of the extreme binary elements.

A first shift register cuts up the message to be coded into half-characters $X_{j1}$ $X_{j2}$ $X_{j3}$ $X_{j4}$ and transmits them to a transfer register; then this second transfer register transmits, at each cycle of operation, the half-character which it has received on a coder of a known type. This gives, at its output, the three central binary elements $U_{j1}$ $U_{j2}$ $U_{j3}$ intended to be substituted at the two central binary elements of the entering half-character and these three central binary elements are stored momentarily in a third register in order to allow of the formation, in the transfer register which contains the half-character $X_{j1}$ $X_{j2}$ $X_{j3}$ $X_{j4}$ of the connecting half-character $$\|U_{(j1)3}\ X_{(j1)4} \mid X_{(j)1}U_{j1}\|$$

The binary elements $U_{(j1)3}$ $X_{(j1)4}$ have been placed in reserve in unitary memory-units during the preceding operating cycle.

The binary elements $U_{j1}$ $U_{j2}$ $U_{j3}$ are then transferred into an output shift register. The connecting half-character is coded in its turn and the binary elements $U_{j114}$ $U_{j115}$ $U_{j116}$ thus obtained are then transferred into the output shift register. Then from this register the coded half-characters come in conformity with Table V.

The invention will now be described with reference to the accompanying drawings, which illustrate the invention but in no restrictive sense.

FIG. 1 gives the electronic diagram of the coder of the invention.

Figure 1:
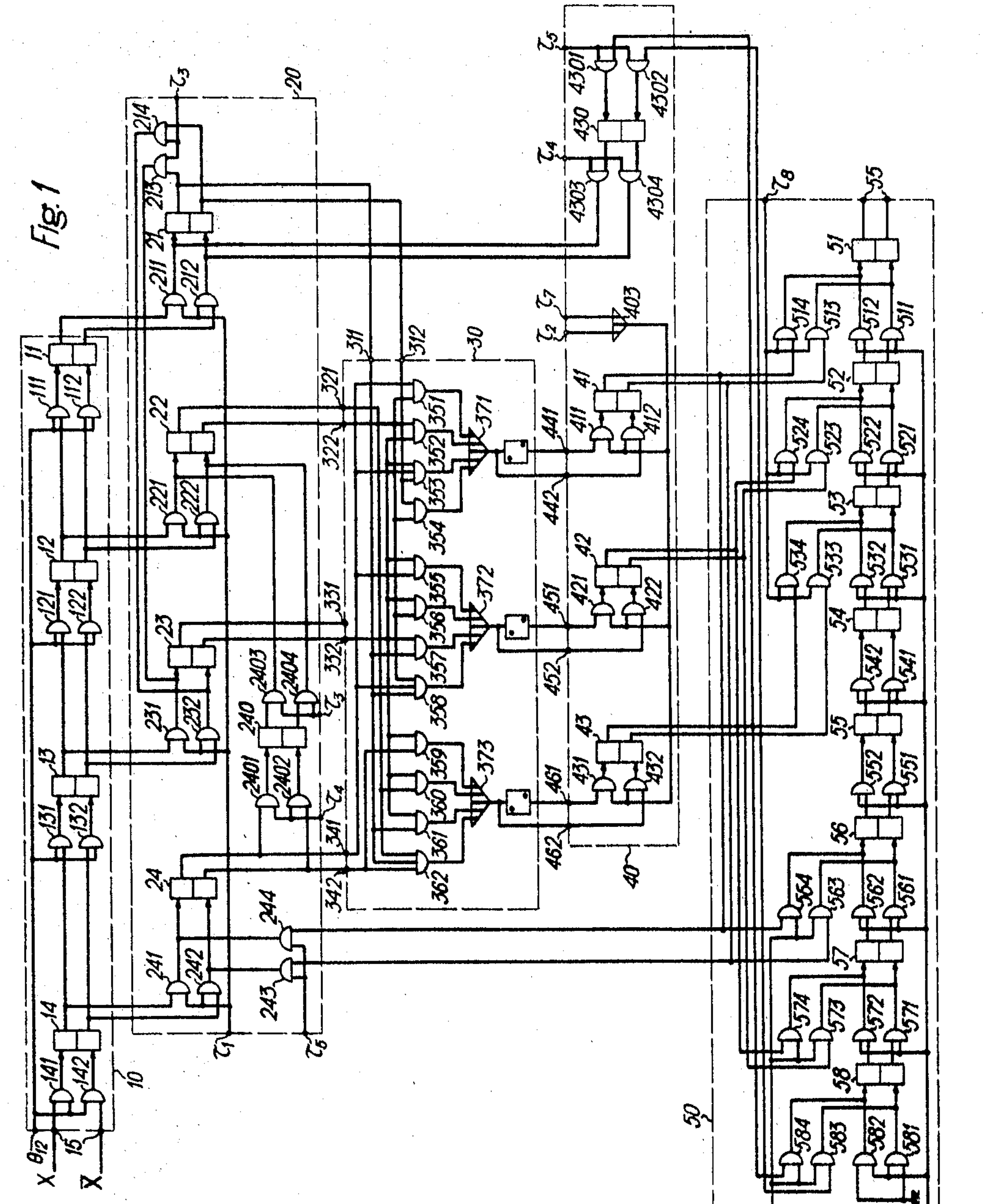
Figure 6:
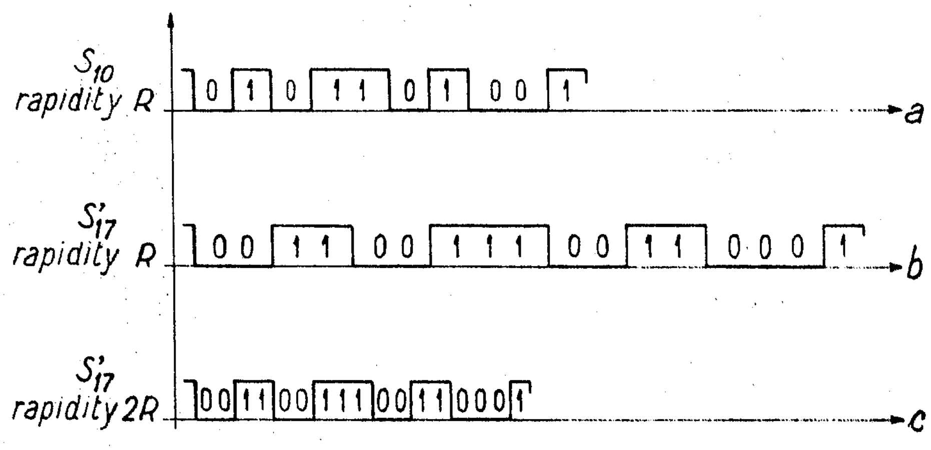
Figure 4:
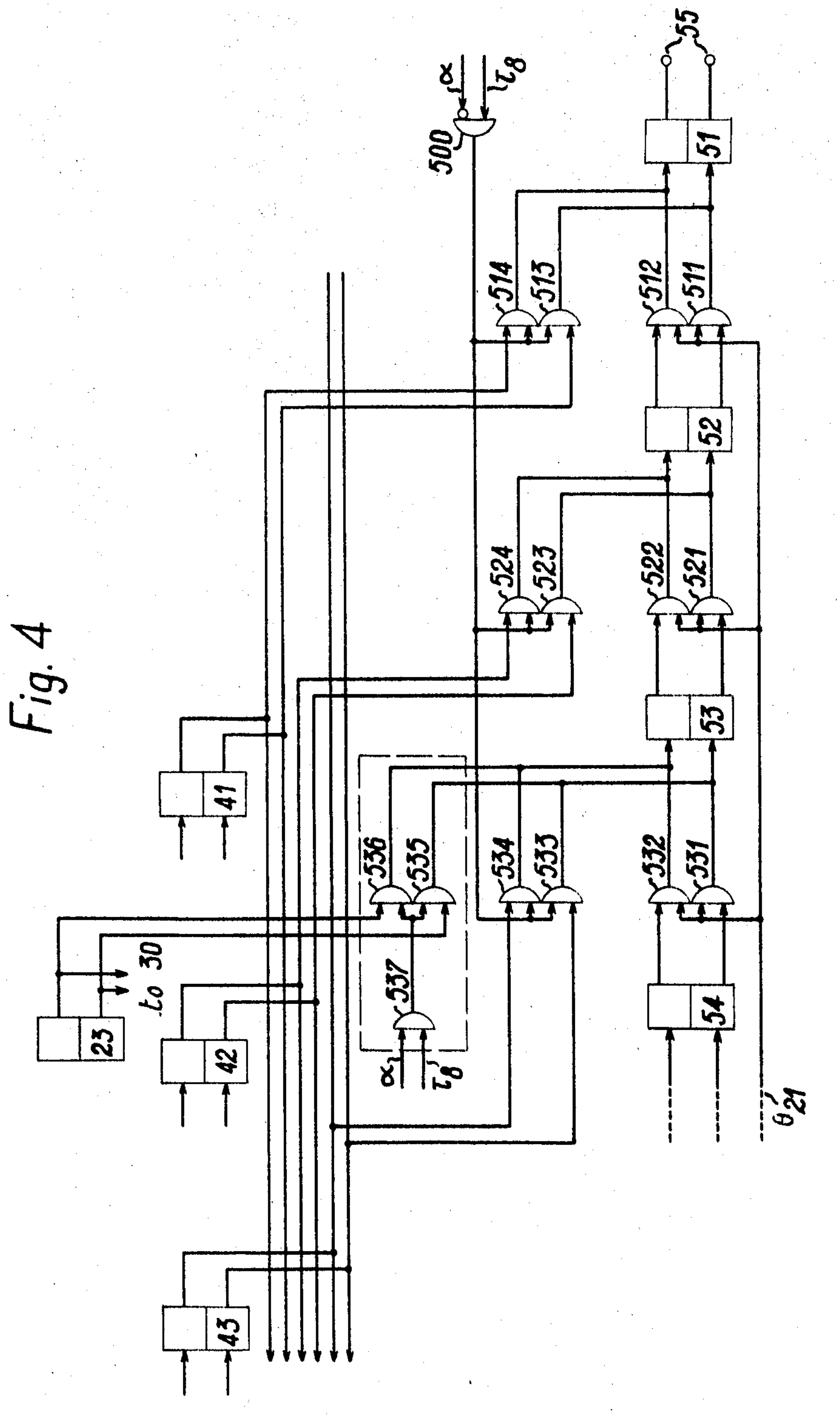
Figure 5:
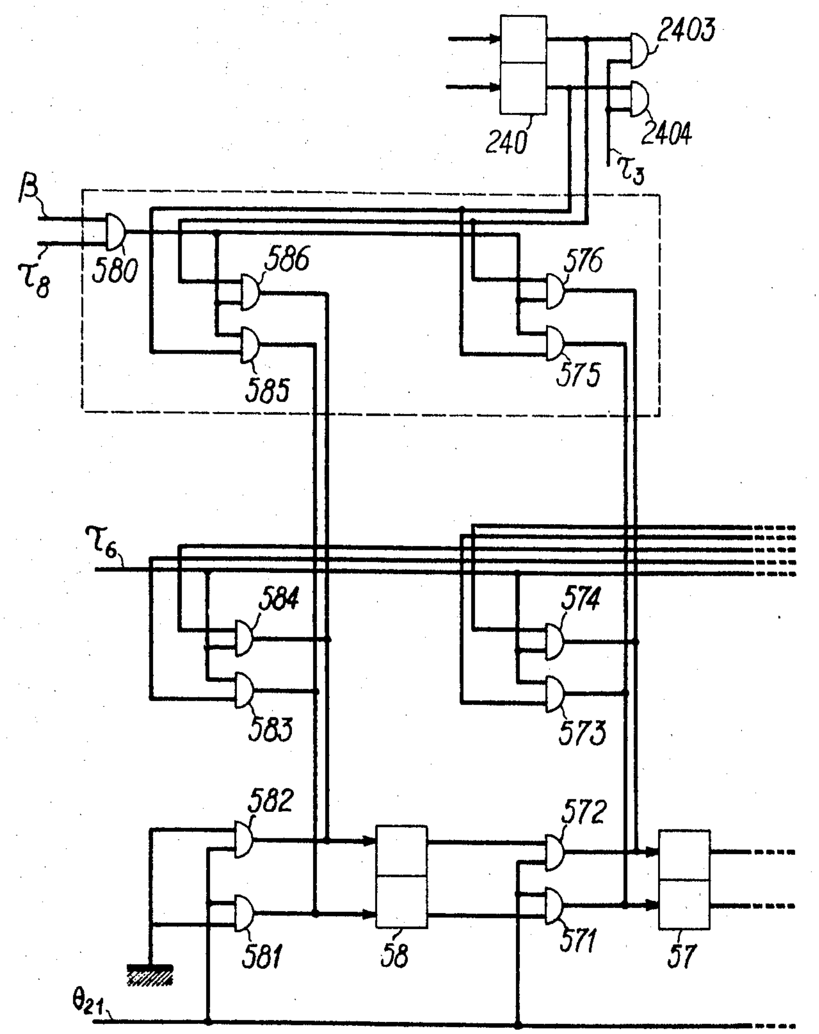

FIGS. 4 and 5 give the logic elements which must be associated with those of the assemblage of FIG. 1 in order to double the extreme binary elements of a message to be transmitted, and FIG. 6 is a diagram of the signals already studied in the initial consideration.

FIG. 1 represents the electronic diagram of the coder of the invention.

In this figure, the block 10 is a shift register comprising four flip-flops 11—14 and allowing of cutting up a message to be coded into half-characters $X_{J1}$ $X_{J2}$ $X_{J3}$ $X_{J4}$.

The binary elements of the message pass in series into this register 10 by the input 15. Each flip-flop is preceded by a pair of two gates, respectively 111—112, 121—122, 131—132, 141—142, which control the entrance into the shift register and the advance of one step to the interior thereof. The binary elements $X_{J1}$, after having occupied successively the flip-flops 14, 13, 12, 11, is fixed in the flip-flop 11 and, when it arrives there, the other elements $X_{J2}$, $X_{J3}$, $X_{J4}$ take position respectively in the flip-flops 12, 13 and 14 which are allocated to them.

As soon as the positioning of the four binary elements is finished, they proceed in parallel from the shift register 10 to occupy respectively the four flip-flops 21, 22, 23, 24 of the transfer-register 20. The outputs of the flip-flops 11, 12, 13, 14 of the register 10 are, for this purpose, connected respectively to the inputs of the flip-flops 21, 22, 23, 24 of the register 20 by the intermediary of pairs of gates 211—212, 221—222, 231—232, 241—242.

The outputs of the flip-flops 21—24 are connected to the input terminals 311—312, 321—322, 331—332, 341—342 of a coder 30 of classic type. Moreover, the output of the flip-flop 21 is connected to the input of the flip-flop 23 by the intermediary of the gates 213—214 and the output of the flip-flop 24 is connected to the flip-flop 240 by the intermediary of the gates 2401—2402.

The coder 30 is intended to provide the group $U_{J1}$ $U_{J2}$ $U_{J3}$ starting from the group $X_{J2}$ $X_{J3}$ and from the composition of the extreme elements $X_{J1}$ $X_{J4}$ of the input half-character. The coder 30 comprises 12 AND gates 351—362 and three OR gates 371—373. The wiring is carried out so as bring about the substitutions of Table V. Among the 12 gates, certain of them are open as a function of the group $X_{J1}$ $X_{J4}$, that is to say of the signals appearing at the inputs 311—312 and 341—342. These gates are conveniently connected to the inputs 321—322 and 331—332 to effect the desired substitution through the open gates. Suppose, for example, that the half-character entering is 0 1 1 0 and that the flip-flops 21—24 produce a signal of −12 v. at the terminals 311, 321, 331, 341 and a signal of 0 v. at the terminals 312, 322, 332, 342 when they are in the condition zero, the signals being inverted when they are in the condition one. The AND gates 351, 352, 355, 356, 357, 358 361 are then open; one finds a signal of −12 v. at the outputs of the OR gates 371—373 and a signal of 0 v. at the terminals 441, 451, 461. The flip-flops 41, 42, 43 are then put into the one condition which gives $U_{J1}U_{J2}U_{J3}$=111.

The outputs of the coder 30 are connected respectively either directly or by the intermediary of an inverter, to the inputs 441—442, 451—452, 461—462 of the flip-flops 41, 42, 43 of the transfer-register 40 which stores, for a certain time, the binary elements $U_{J1}$ $U_{J2}$ $U_{J3}$, in order to allow the coder to carry out certain operations before their utilization.

In fact, it is first necessary:

To transfer the contents of the flip-flop 21, that is to say the binary element $X_{J1}$, into the flip-flop 23, through the gates 213—214;

— to transfer the contents of the unitary memory-unit 240 which contains the binary element $X_{J11)4}$ of the preceding half-character, into the flip-flop 22 through the gates 2403—2404.

Consequent upon these transfers, the transfer register 20 contains the binary elements:

$X_{J1}$ $X_{(J11)4}$ $X_{J1}$ $X_{J4}$

The element $X_{(J11)3}$ has been put into store in the flip-flop 430 through the gates 431—432. Its content is transferred from the unitary memory-unit 430 through the gates 4303—4304, into the flip-flop 21. At the same time, the binary element $X_{J4}$ is transferred into the unitary memory-unit 240 through the gates 2401—2402, with a view to its utilization for the following half-character.

Consequent upon the transfer from the memory-unit 430 into the flip-flop 21, the transfer-register contains the binary elements:

$U_{(J11)3}$ $X_{(J11)4}$ $X_{J1}$ $X_{J4}$

The content of the flip-flop 41, that is to say the binary element $U_{J1}$, is transferred into the flip-flop 24, through the gates 243—244 so that the transfer register 20 contains, finally, the connecting half-character:

$||U_{(J-1)3}$ $X_{(J-1)4}|$ $X_{J1}$ $U_{J1}||$

After the various preliminary operations above-mentioned, the content of the transfer register 40, that is to say $U_{J1}$ $U_{J2}$ $U_{J3}$, which, as was seen, has been stored in anticipation, is transferred into flip-flops 56, 57, 58 of the second shift register 50 through, respectively, the gates 563—564, 573—574, 583—584.

Immediately thereafter, the transfer register 40 is refilled, but this time with the binary elements $U_{(J11)4}$ $U_{(J11)5}$ $U_{(J11)6}$ formed by the coder 30.

These binary elements $U_{(J11)4}$ $U_{(J11)5}$ $U_{(J11)6}$ are then transferred into the flip-flops 52, 53, 54 ($j_1$the shift register 50 through, respectively, the gates 513—514, 523—524, 533—534.

During the advancement of the shift register 50, the series of binary elements $U_{(J11)4}$ $U_{(J11)3}$ $U_{(J11)6}$$U_{J1}$ $U_{J2}$ $U_{J3}$ emerges in series by the output 55 of the said register 50.

The functioning which has just been described takes place in nine phases. These phases are controlled by the application of pulses to the entrances of the AND gates conveniently distributed in the different registers 10, 20, 40, 50 of the coder of the invention.

Figure 2:
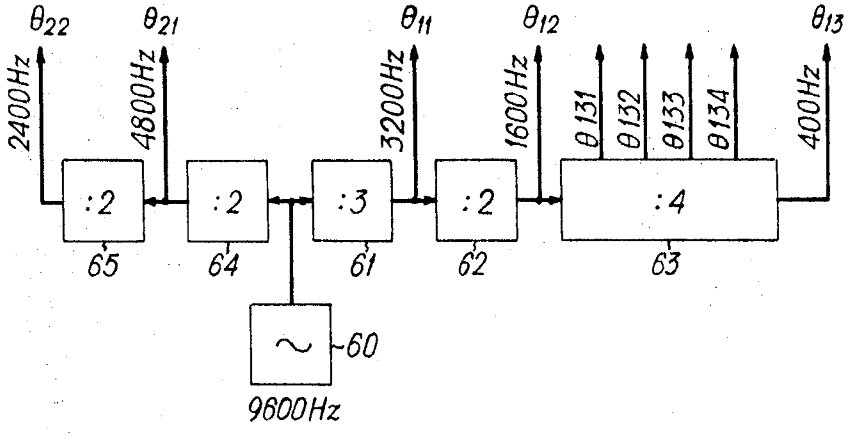
FIG. 2 is a block diagram showing the organization of a time base allowing of ensuring ensuring the cyclic functioning of the coder of the invention.

These pulses are provided by a time base represented in FIG. 2 in the form of a block diagram.

In this figure, 60 is a clock giving a train of rectangular pulses, the alternations of which are of the same duration $T/2$ and frequency $1/T$=9600 Hz. (diagram $\theta$, FIG. 3).

The clock 60 feeds in parallel two frequency dividers 61 and 64. The divider 61 gives at its output the train of rectangular pulses $\theta_{11}$ (FIG. 3) of frequency 3200 Hz., the alterations of which are of equal duration $3T/2$. The divider 64 gives at its output the train of rectangular pulses $\theta_{21}$ (FIG. 3) of frequency 4800 Hz., the alternations of which are of equal duration $T$.

Figure 3:
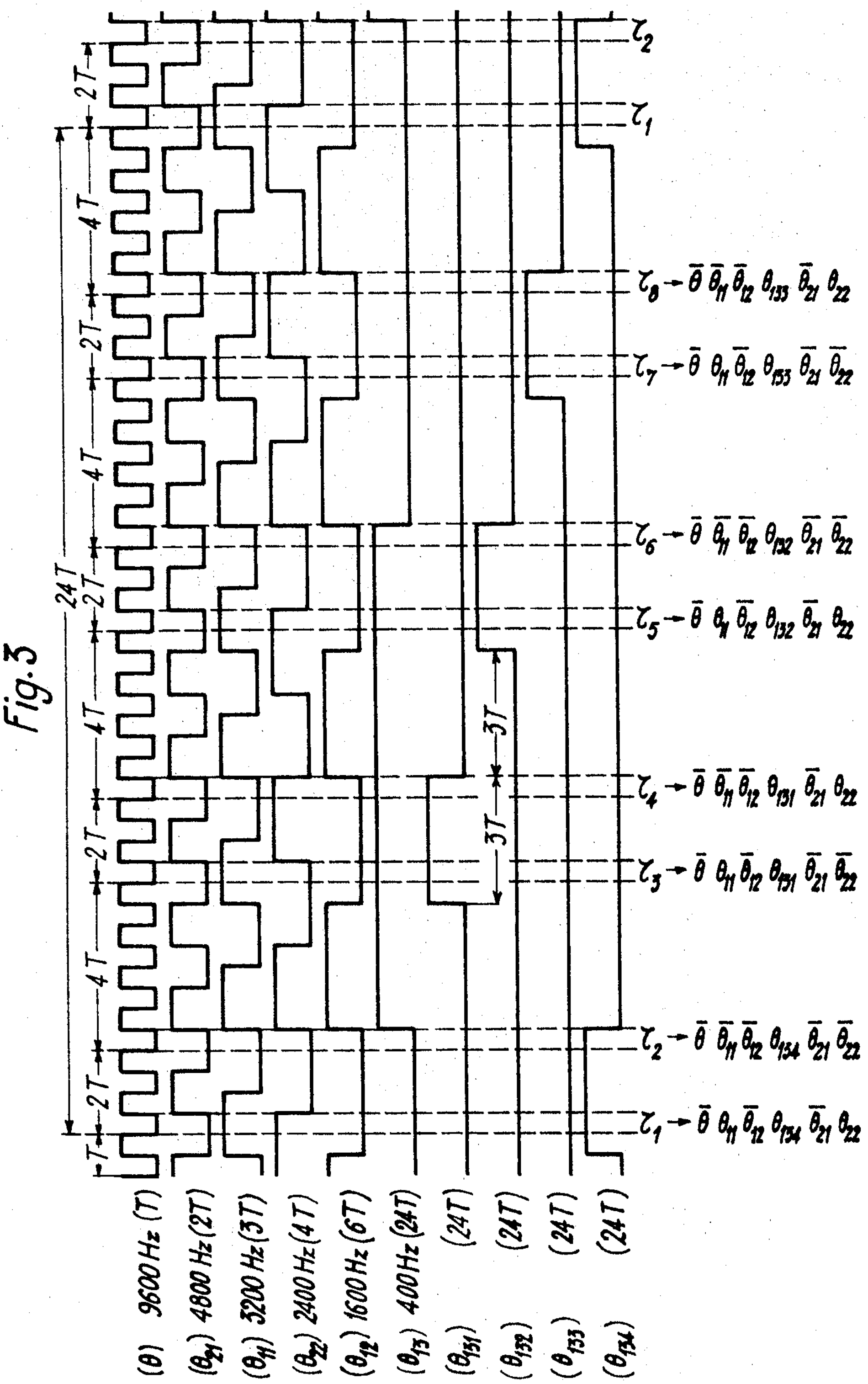
FIG. 3 represents a diagram of the pulses formed by the time base of FIG. 2.

Following on the divider-by-three 61 are connected, in line, a divider-by-two 62 and a divider-by-four 63. At the output of the divider 62 one obtains a train of rectangular pulses $\theta_{12}$ (FIG. 3) of frequency 1600 Hz., the alternations of which are of equal duration $3T$. Starting from the divider 63, one obtains four trains of rectangular pulses $\Theta_{131}$, $\theta_{132}$, $\theta_{133}$, $\theta_{134}$ called "synchro-character" (FIG. 3).

These four trains of pulses present identical characteristics but are shifted in time by $3T$. They have a frequency of 400 Hz., but their alternations are of unequal duration: the positive alternation has a duration of $3T$, whereas the duration of the negative alternation is $21T$.

To the output of the divider-by-two 64 is connected the divider-by-two 65 which gives, at its output, a train of rectangular pulses $\theta_{22}$ (FIG. 3) of frequency 2400 Hz. and the alternations of which are of equal duration $2T$.

This assemblage of signals allows of characterizing nine instants $\tau_1$ to $\tau_9$ of equal duration $T/2$ and the positions in time of which are determined by the synchro-character pulses.

The synchro-character pulse $\theta_{134}$ locates the instants $\tau_1$ and $\tau_2$, these being spaced by $2T$. The synchro-character pulse $\theta_{131}$ locates the instants $\tau_3$ and $\tau_4$, these being spaced by $2T$. It results therefrom that two instants, such as $\theta_2$ and $\theta_3$, are spaced by $4T$. The synchro-character pulses $\theta_{132}$ and $\theta_{133}$ are relative to the instants $\tau_5$, $\tau_6$ and $\tau_7$, $\tau_8$.

The functioning of the time base being cyclic, it results from the preceding considerations that the duration of this cycle is $24T$.

As FIG. 3 shows, each phase is materialized by eight pulses. These pulses in FIG. 3 are designated by $\tau_1$ to $\tau_8$.

The advancement of the shift register 10 is ensured by the signal $\theta_{12}$ (1600 Hz.) which controls the pairs of AND gates 141—142, 131—132, 121—122, 111—112 the outputs of which are connected respectively to the inputs of the flip-flops 14, 13, 12, 11. The progression of the register 10 is effected on the fronts of positive polarity of the signal $\theta_{12}$.

The advance of the shift register 50 is ensured by the signal $\theta_{21}$ (4800 Hz.) which controls the pairs of AND gates 581—582, 571—572, ...... 511—512 the outputs of which are connected respectively to the inputs of the flip-flops 58, 57, ...... 51.

The functioning of the coder of the invention is as follows:

1. At the instant $\tau_1$, the gates 241—242, ...... 211—212 connected respectively to the inputs of the flip-flops 24, ...... 21 of the transfer register 20 are open and the half-character $X_{J1}$ $X_{J2}$ $X_{J3}$ $X_{J4}$ is coded in the coder 30.

2. At the instant $\tau_2$, the AND gates 431—432, 421—422, 411—412 connected respectively to the inputs of the flip-flops 43, 42, 41 of the transfer register 40 are open and this register stores momentarily the binary elements $U_{J1}$ $U_{J2}$ $U_{J3}$.

3. At the instant $\tau_3$, the AND gates 213, 214 connected to the outputs of the flip-flops 21 of the transfer register 20, and the AND gates 2403—2404 connected to the outputs of the unitary memory-unit 240 are open. The binary element $X_{J1}$ is transferred into the flip-flop 23 and the binary element $X_{(J1)4}$ is transferred into the flip-flop 22.

4. At the instant $\tau_4$, the AND gates 2401—2402 connected to the inputs of the unitary memory-unit 240 and the AND gates 4303—4304 connected to the outputs of the unitary memory-unit 430 are open. One thus transfers the binary element $X_{J4}$ from the flip-flop 24 into the unitary memory-unit 240 and the binary element $U_{(J1)3}$ from the unitary memory-unit 430 into the flip-flop 21.

5. At the instant $\tau_5$, the AND gates 4301—4302 connected to the inputs of the unitary memory-unit 430 and the AND gates 243, 244 connected to the inputs of the flip-flop 24 are open. One thus transfers the binary element $U_{J3}$ from the flip-flop 43 into the unitary memory-unit 430 and the binary element $U_{J1}$ into the flip-flop 24.

6. At the instant $\tau_6$, the AND gates 583—584, 573—574, 563—564 connected respectively to the inputs of the flip-flops 58, 57, 56 of the shift register 50 are open. One thus transfers the binary elements $U_{J3}$ $U_{J2}$ $U_{J1}$ coming from the register 40 into the said flip-flops 58, 57, 56.

7. At the instant $\tau_7$, the AND gates 431—432, 421—422, 411—412 of the flip-flops 43, 42, 41 are open. One thus transfers the binary elements $U_{(J1)6}$ $U_{(J1)5}$ $U_{(J1)4}$ into the transfer register 40.

8. At the instant $\tau_8$, the AND gates 533—534, 523—524, 513—514 connected respectively to the inputs of the flip-flops 53, 52, 51 of the shift register 50 are open. One thus transfers the binary elements $U_{(J1)6}$ $U_{(J1)5}$ $U_{(J1)4}$ into these flip-flops 53, 52, 51.

To conclude, it is proper to observe that when one transmits several messages successively, one does not create discontinuity in time to separate two consecutive messages. In other words, one considers that this assemblage of messages constitutes one and the same message. It is thus unnecessary to double the extreme elements $X_{11}$ and $\underline{X_{\lambda 4}}$ of each message. Only the elements $X_{11}$ of the first message and $\underline{X_{\lambda 4}}$ of the last are to be doubled.

The two phases of functioning of the coder of the invention which concern the doubling of the said elements are thus not periodic. They can therefore be achieved by means of logic components controlled by signals not coming from the time base of the coder.

These components, which have not been represented on FIG. 1 in order to simplify it, are shown in FIGS. 4 and 5.

The doubling of the element $X_{11}$ is brought about:

1. by connecting momentarily the flip-flop 23 of the transfer register 20 to the flip-flop 53 of the shift register 50, 2. by blocking momentarily the transfer of the content of the flip-flops 41, 42, 43 of the transfer register 40 into the flip-flops 51, 52, 53 of the shift register 50.

An instant after the beginning of the transmission of a message, the flip-flops 56, 55, 54, 53, 52, 51 of the register 50 must contain respectively the binary elements $U_{13}$ $U_{12}$ $U_{11}$ $X_{11}$ $X_{11}$ 0. Moreover, at the beginning of this transmission, the flip-flops of the register 40 may contain a series of binary elements $U_{30}$ $U_{20}$ $U_{10}$ not forming part of the message; it is not then necessary that this series is transferred into the register 50.

At the instant $\tau_8$ which precedes the instant $\tau_1$ of the beginning of transmission, the pulse $\tau_8$ which controls the opening of the AND gates 513, 514, 523, 524, 533, 534 is blocked by the intervention of the AND gate 500 (FIG. 4) which is rendered nonpassing by the application, to one of its inputs, of an inhibiting signal of short duration $\alpha$.

The same signals $\sigma_8$ and $\alpha$ are applied to the inputs of an AND gate 537. This, becoming momentarily passing, allows of deblocking the pair of AND gates 535,536 (FIG. 4) which join the flip-flop 23 to the flip-flop 53. This latter will then contain the element $X_{11}$ which doubles the element $X_{11}$ which, at the same moment, the flip-flop 54 contains.

At the instant $\tau_8$ of the end of transmission of a message, the content of flip-flops 58, 57, 56, 55, 54, 53, 52, 51 is 0, 0, $\underline{U_{\lambda 3}}$, $U_{\lambda 2}$, $U_{\lambda 1}$, $U_{(\lambda-1)6}$, $\underline{U_{(\lambda-1)5}}$, $\underline{U_{(\lambda-1)4}}$ the two flip-flops 58 and 57 are thus available. Moreover, at this same instant $\tau_8$, the binary element $\underline{X_{\lambda 4}}$ is located in the unitary memory-unit 240. It is then transferred simultaneously into the two flip-flops 57 and 58 by means of the pairs of AND gates 575—576, 585—586 (FIG. 5) which are rendered passing by the application at their inputs of the signal coming from the AND gate 580, itself rendered passing by the application, at its inputs, of signals characterizing the instant $\tau_8$ and of the momentary signal $\beta$.

A numerical example of the application of the invention will now be given.

Let the message ($m$=16; $\lambda$=4) be 0 1 1 0—0 1 1 1—0 1 0 0—0 1 0 1

The application of the Table V to the half-characters gives the message: 0 1 1 [1 0—0 1 ] 1 [1 1—0 1 ] 1 [0 0—0 0 ] 0 0 1

The application a second time of Table V to the frontier half-characters gives the message:

0 1 1—1 0 0 0 1—1—1 1 0 0 1—1—0 0 0 0 0—0 0 1 and the doubling of the extreme bits gives the message: 0 0 1 1—1 0 0 0 1—1—1 1 0 0 1—1—0 0 0 0 0—0 0 1 1 in which the dashes only serve to make comprehensible the process of formation. This message comprises 25 binary elements.

What we claim is:

1. A code converter for a data transmission system in which information supplied in the form of a train of binary signals is converted into a further binary signal train including as increased number of signals, comprising means for dividing said train into consecutive signal groups each including a constant number of signals, and means for translating each one of said groups according to a predetermined relationship into a further group of binary signals including a number of said signals larger than but less than twice said constant number, said relationship being so selected that every transition between adjacent signals of opposite value in said further train is preceded by at least two binary signals of the same value.

2. A code converter as claimed in claim 1, in which said constant signal number is equal to four, in which said predetermined relationship is so selected that the two middle binary signals in each of said first-named groups are replaced by three binary signals having only one transition between them, and that the last signal in each of said first-named signal groups and the first signal in the immediately succeeding one of latter said groups are replaced by three binary signals having only one transition between them, whereby every transition in said further train is preceded by at least two binary signals of the same value.

3. A code converter as claimed in claim 1, in which each one of said first-named signal groups includes four binary signals, in which said four binary signals in each of said first-named groups are first replaced by a five-binary-signal group, and in which thereafter the last two signals in each one of latter said groups and the first two signals in the immediately succeeding one of latter said groups are replaced by a new group of five binary signals, said relationship being so selected that any transition in said further signal train in preceded by at least two binary signals of the same value.

4. A code converter as claimed in claim 1, in which each one of said first-named binary signal groups includes a number 4λ of binary signals, λ being an integer number, and in which each one of said further binary signal groups includes (6λ+1) signals.